UNITED STATES PATENT OFFICE.

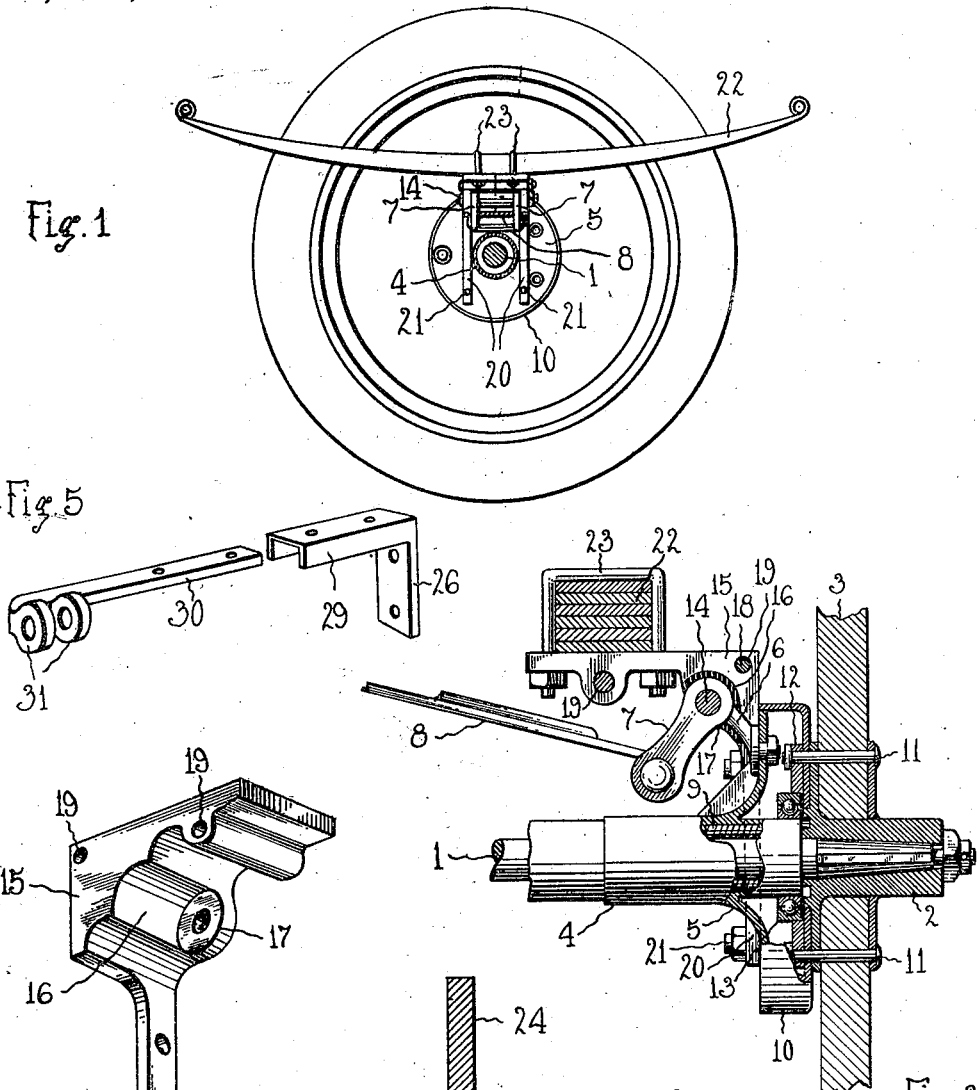

JOSEPH B. POSPESHIL, OF DETROIT, MICHIGAN.

ATTACHMENT FOR AUTOMOBILES.

1,200,020.  Specification of Letters Patent.  Patented Oct. 3, 1916.

Application filed March 31, 1916. Serial No. 87,985.

*To all whom it may concern:*

Be it known that I, JOSEPH B. POSPESHIL, a citizen of the United States of America, residing at Detroit, in the county of Wayne and State of Michigan, have invented certain new and useful Improvements in Attachments for Automobiles, of which the following is a specification, reference being had therein to the accompanying drawings.

Manufacturers are now placing upon the market a trunk and delivery automobile body which may be substituted for pleasure or touring bodies, thus permitting of an automobile chassis originally designed for pleasure or touring purposes being used for commercial purposes. Such conversion has been easily performed in connection with the well known type of "Ford" automobile, but it has been found that the bearings and springs of the rear axle of the "Ford" chassis have not been designed for a heavy load, consequently it has been necessary to resort to an additional spring suspension or some means of sustaining a heavy load relative to the rear axle.

This invention relates to attachments which permit of a pleasure or touring vehicle being readily converted into a vehicle for commercial purposes, the attachments being in the form of additional bearings that may be easily and quickly installed, and an additional spring suspension which does not necessitate any alterations in the present spring suspension or rear axle construction.

The invention also resides in certain matters to be hereinafter described and then claimed, and reference will now be had to the drawing, wherein—

Figure 1 is an elevation of the inner side of an additional spring suspension for an automobile body; Fig. 2 is another view of the same, showing an additional bearing in connection with a rear axle and wheel; Fig. 3 is an enlarged perspective view of a portion of a spring support; Fig. 4 is a cross sectional view of a portion of a vehicle body, showing an extensible spring attachment, and Fig. 5 is a perspective view of the attachment.

In order that my invention may be fully undestood, I have illustrated a portion of a rear axle 1 having a hub member 2 and a wheel 3. Associated with the rear axle 1 is an axle casing 4 having an end flange 5 provided with a bracket 6 for a shackle 7 supporting the end of a spring 8. Between the axle 1 and the casing 4 is an anti-frictional roller bearing 9 and the inner side of the wheel 3 has a brake hand drum or housing 10 to receive the end flange 5 of the axle casing 4. The elements just described are of the ordinary and well known type forming part of the "Ford" chassis, and reference will now be had to the attachments as applied to the same in order that said elements may be used for heavy work.

The same bolts 11 or the fastening means employed for holding the drum or housing 10 in engagement with the wheel 2 are also employed for holding a flat annular plate or ring 12 on the inner side of the drum or housing 10, and interposed between said plate or ring and the axle casing 4 is an additional anti-frictional bearing 13, which may be of any well known type of ball or roller bearing. This additional bearing 13 is adapted to coöperate with the roller bearing 9 in non-frictionally sustaining the rear axle casing 4 and other parts relative to the rear axle 1. The same pin 14 or fastening means for connecting the shackle 7 to the bracket 6 is also employed for holding a two-part bracket or support relative to the rear axle casing 4. The bracket or support comprises two members 15 cut away as at 16 and formed with aperture ears 17 whereby the members may embrace the bracket 6 and the upper end of the shackle 7, with the pin 14 passing through the apertured ears 17. The members are furthermore connected by bolts 18 or other fastening means passing through openings 19 in said members or bosses thereof, and each member has a depending arm 20 adapted to be bolted or otherwise connected as at 21, to the end flange 5 of the rear axle casing 4. The members 15 of the support or bracket project inwardly from the end flange of the rear axle casing, said support or bracket overhanging the shackle 7 and the end of the spring 8. An additional spring 22 can be mounted upon the support or bracket and connected thereto by straps 23 or other fastening means. With the spring 8 disposed transversely of a vehicle body, the spring 22 may be disposed longitudinally thereof to coöperate with the spring 8 in sustaining a heavy load.

In Figs. 4 and 5, there is illustrated a spring bracket or attachment by which the end of the spring 22 may be connected to a vehicle body. A portion of the vehicle body 24 has one of the sub-frames or sills 25 provided with an angle bracket 26, which is connected to the sill and the body by bolts 27 and 28 or other suitable fastening means. The horizontal portion of the bracket 26 has depending side flanges 29 and between said side flanges is an extension bar 30 held in engagement with the bracket 26 by the bolts 28. The outer end of the extension 30 terminates in apertured ears 31 to which the end of the spring 22 may be connected. The bar 30 may be adjusted relative to the bracket 26, whereby the spring attachment may be used in connection with vehicle bodies of various widths, and by connecting the attachment to the sill 25 and to the body 24, a strong and durable connection is established between the spring 22 and the vehicle body.

It is thought that the utility of the attachment will be apparent without further description, and while in the drawing there is illustrated a preferred embodiment of the invention, it is to be understood that the structural elements are susceptible to such variations and modifications as fall within the scope of the appended claims.

What I claim is:—

1. The combination of a rear axle casing, a spring shackle bracket, and a spring support embracing the spring shackle bracket and attached thereto.

2. The combination of a rear axle casing, a spring shackle bracket, and a two-part spring support embracing said spring shackle bracket and connected thereto and to the end of said rear axle casing.

3. The combination with the rear axle casing having an end flange, of a spring shackle bracket connected thereto, a two-part spring support, a bolt connecting the parts of said spring support together and adapted as a shackle connection, and means for connecting each part of said spring support to the end flange of said rear axle casing.

4. The combination with a rear axle casing having an end flange, of a spring shackle bracket connected to the end flange of said rear axle casing, a two-part spring support inclosing said bracket and having each part thereof extending downwardly relative to said rear axle casing and connected to the end flange thereof, and means connecting the parts of said spring support together.

5. The combination of a rear axle casing, a spring shackle bracket, and a spring support fitted over said bracket and connected to the end of said rear axle casing.

In testimony whereof I affix my signature in the presence of two witnesses.

JOSEPH B. POSPESHIL.

Witnesses:
ANNA M. DORR,
KARL H. BUTLER.

Copies of this patent may be obtained for five cents each, by addressing the "Commissioner of Patents, Washington, D. C."